March 16, 1954 P. J. CHENERY 2,672,334
ACCELEROMETER
Filed Dec. 15, 1948
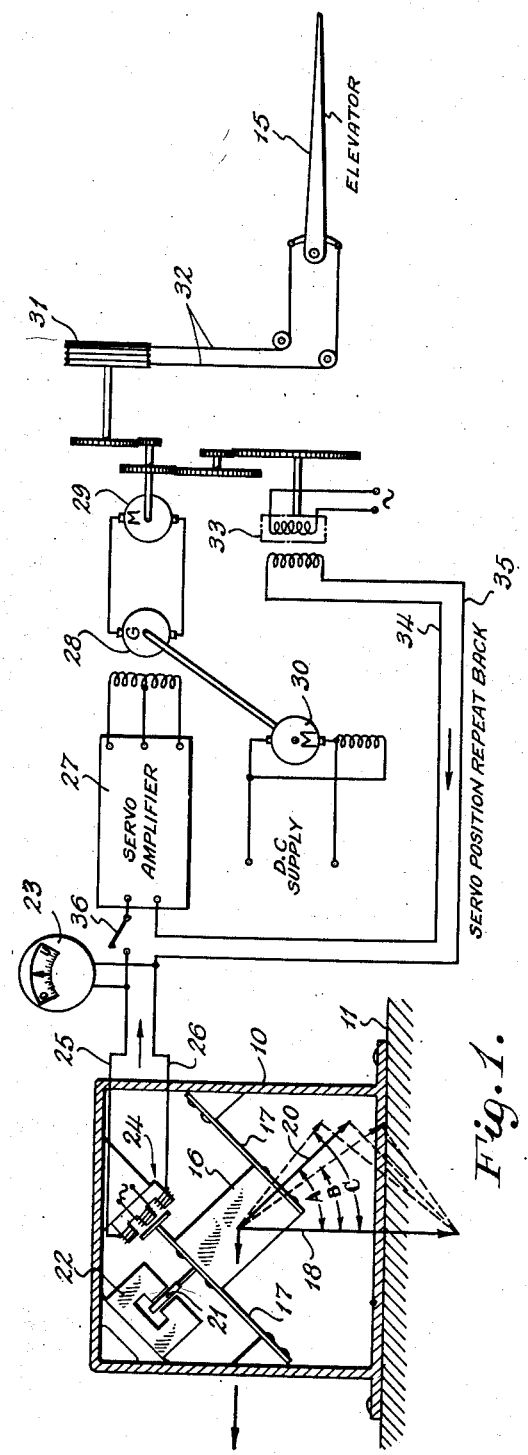
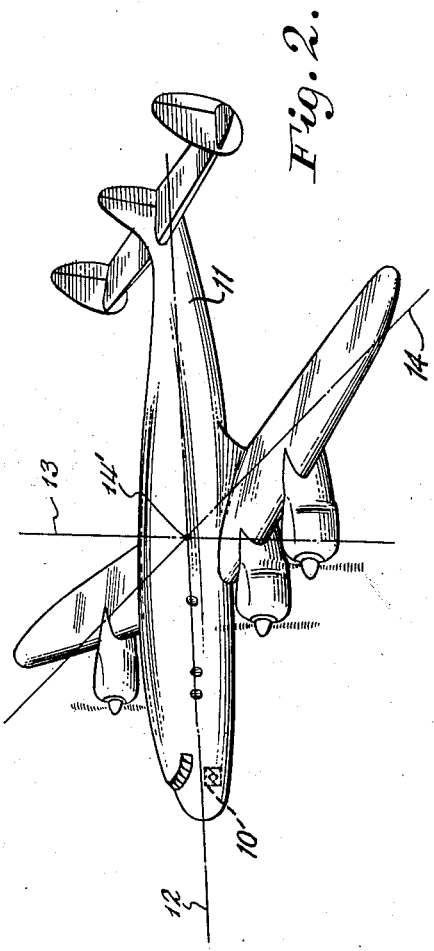
INVENTOR
PETER J. CHENERY
BY
Arthur H. Serrell
ATTORNEY Patented Mar. 16, 1954

2,672,334

UNITED STATES PATENT OFFICE 2,672,334

ACCELEROMETER

Peter J. Chenery, Pelham, N. Y., assignor to The Sperry Corporation, a corporation of Delaware Application December 15, 1948, Serial No. 65,405

2 Claims. (Cl. 264—1)

This invention relates to accelerometer devices for detecting tilt about a horizontal axis from a reference position.

The device includes a gravitationally sensitive part that is positionable, relative to a part movable about a horizontal axis, by a particular component of $g$ to determine the reference position of the movable part. Sensitivity as to the direction of tilt of the movable part from the reference position is obtained by arranging the parts so that the effective component of $g$ on the sensitive part becomes either greater than or less than the component of $g$ determining the reference position when tilt occurs. While the vertical directivity of the acceleration of gravity provides the actual reference for the device, the sensitive part provided in accordance with the present invention is arranged in relation to the vertical directivity of $g$ so that it is positioned by a component of $g$ such as $g$ times the cosine 45° to determine the reference position of the sensitive part to the part with which it is compared.

One of the features of the invention resides in the provision of a device of this character having a sensitive mass or weight responsive to the acceleration of gravity that is positionable to detect tilt from a horizontal reference attitude approximating a level condition.

A further feature of the invention resides in the combination of a device of this character in a dirigible craft to provide a single element for controlling the craft automatically about one of its horizontal axes operable in an automatic pilot, the arrangement of the device in the craft being such as to obtain a response therefrom to accelerations of the craft in the vertical plane, to angular accelerations of the craft about the horizontal axis of the craft about which it is effective to exert control, and to tilt in the attitude of the craft from a reference position about such axis. The device is fixed to the craft and arranged so that the sensitive element responds in a proper sense regardless of the fact that the craft may be subject to any combination of the above noted conditions.

Other features and structural details of the invention will be apparent from the following description when read in relation to the accompanying drawing, wherein Fig. 1 is a side elevation of a device constructed in accordance with the present invention with the frame or housing part thereof in vertical section. This figure also includes a schematic showing a circuit arrangement for an aircraft automatic pilot in which the device functions as the single control element in connection with a suitable pick-off.

Fig. 2 is a perspective view of a dirigible craft showing the location and arrangement of the acceleration responsive device therein.

With reference to the drawing, a device embodying the present inventive concepts is shown to include a frame or first part 10 in the form of a housing. The frame 10 is fixedly connected in a suitable manner to a body 11 such as that of a dirigible craft as shown in Fig. 2. The frame 10 is therefore mounted on an object that is movable about a horizontal axis which may be considered for example the pitch axis of the craft illustrated. As shown in Fig. 2, the roll or fore and aft axis of the craft is indicated at 12. The vertical or yaw axis of the craft is designated at 13. The pitch axis 14 of the craft is perpendicular to both axes 12 and 13 and extends through the craft's center of gravity 14'. Motion about the pitch axis is controlled by means such as the elevators 15. As shown, in Fig. 2 the tilt detecting device is mounted on the dirigible craft 11 forward of its pitch axis 14 and below its roll or fore and aft axis 12. The frame 10 of the device is fixed to the object on which it is used so that it moves with movement of object about its pitch or horizontal axis.

The sensitive or movable part of the device is shown in Fig. 1 in the form of a spring restrained mass or weight 16. Part 16 of the device is positionable by a reference defining component of $g$, the acceleration of gravity, relative to the first part or frame 10 along a path at an acute angle to the vertical in a plane normal to the axis 14 provided for the device. The weight may be supported as shown by two leaf springs 17 which connect the same to the frame or first part 10. The acceleration of gravity is indicated by a vector designated by the arrow 18 in the drawing. The frame 10 as shown in Fig. 1 is illustrated in a position corresponding to a level condition of the object or craft about axis 14. At this time, the mass 16 is situated in a reference defining position relative to the frame along a path at a 45 degree angle to the vertical as indicated by angle A in Fig. 1. The path along which the mass is movable relative to the frame is indicated by line 20.

Means for damping the movements of the part 16 may be provided as shown in the form of an electromagnetic device having a vane 21 connected to the mass. The vane 21 is situated in the magnetic field of a magnetic element 22 fixedly mounted on the frame 10 in a suitable manner.

The reference position of the craft or object about axis 14 is considered one in which the pitch attitude is such that the craft is neither climbing, or moving in a positive sense relative to the reference position, or diving, or moving in a negative sense relative to the reference position. In accordance with the invention the parts of the device are so arranged that mass 16 is positionable relative to the frame 10 by a particular component of $g$, in this instance $g$ cosine 45°, to determine the reference position of the frame. The mass 16 is also positionable by a component of $g$ with tilt of the frame that is either greater than or less than the component of $g$ determining the reference position. In the operation of the device in Fig. 1, with tilt of the frame in a positive sense, that is, when the nose of the craft rises, the frame moves in a clockwise direction as viewed in this figure so that the angle between line 20 and vector 18 becomes smaller such as indicated by angle B. With tilt in a negative sense, that is, when the nose of the craft goes down, the frame moves in a counterclockwise direction as viewed in this figure so that the angle between line 20 and vector 18 becomes larger such as indicated by angle C. Tilt is thus detected by the device by an increase in the effective component of $g$ with tilt in a positive sense so that the mass moves downwardly relative to the frame. With tilt in a negative sense, as the component of $g$ on the mass 16 decreases, the mass moves upwardly relative to the frame. In other words, the parts of the device are so arranged that with tilt of the frame the angle A either initially increases or decreases in accordance with the sense of tilt of the frame from its reference position. In the illustrated embodiment of the invention, the device operates within an effective range of ninety degrees, the frame being tiltable from a level condition about a horizontal axis in a positive sense through forty-five degrees and in a negative sense through forty-five degrees. At the effective upper limit of forty-five degree positive tilt, the effect of gravitational acceleration on the mass 16 is one $g$. At the effective lower limit of forty-five degree negative tilt, the effect of gravitational acceleration is null. When the frame is in a level condition, the mass is positioned relative to the frame, by the effect thereon of a component of gravitational acceleration between one $g$ and null which in the arrangement shown is a cosine forty-five degree component of $g$. The device is useful in combination with an indicator to measure tilt and in combination with a steering means to correct tilt.

Indicating means for the device may be provided by a suitable phase sensitive galvanometer 23 that is operated by the output of a pick-off 24 by way of leads 25, 26. The pick-off illustrated is an E-transformer type signal device whose stator is fixed to the frame 10 and whose armature is connected to move with the mass 16. The central leg of the stator of the pick-off is energized by a suitable source of alternating current electrical energy. The output windings of the pick-off connect with leads 25 and 26. With the armature in a central position relative to the stator, the output signal from the pick-off is null so that the pointer of the galvanometer indicates a condition of zero pitch for the craft. The pick-off reflects the relative movements of the mass 16 and frame 10 from the reference position, the same providing a signal for operating meter 23 whose amplitude depends on the extent of the relative displacement of its armature and stator and whose phase depends on the sense of the displacement. Since the sensitive mass 16 is secured between and flat against the end portions of the pair of springs 17 which extend in parallel relation from opposite walls of the frame 10 as shown in Fig. 1, movement of said mass in response to acceleration components acting on the mass in a direction normal to the flat surfaces of the springs will be substantially linear. Therefore, if one part of pick-off 24 is secured to the mass and the other part thereof is secured to the frame, relative movement between the two parts will be substantially linear and will, therefore provide an output signal on leads 25 and 26 which varies substantially linearly with the effective component of acceleration acting on the mass.

As shown, the tilt detecting device may be employed in combination with a dirigible craft having an automatic pilot for controlling the craft about a horizontal axis such as axis 14. In this instance, the pick-off 24 of the device provides the sole control signal for an automatic pilot that is shown operatively connected to the elevators 15 of the craft 11. As illustratively shown in Fig. 1, such an automatic pilot may include a servo amplifier 27 adapted to receive the output of the pick-off 24. The output of amplifier 27 may be fed to the field circuit of a direct current generator 28 of a motor-generator set of the Ward-Leonard type. As shown, the armature circuit of generator 28 energizes the armature of a servomotor 29. The field circuit (not shown) of motor 29 is energized from a constant source. Generator 28 is driven by a constant speed motor 30 that is energized from a constant source. The servomotor 29 is operatively connected to the elevators 15 of the craft by way of suitable reduction gearing, a cable drum 31 and cable 32. The automatic pilot may include a position repeat-back in the form of a selsyn device 33 whose rotor is positioned in accordance with the displacement of elevators 15 from a null condition to provide a feed-back signal for the automatic pilot. As shown, such a signal may be fed to the amplifier 27 by way of leads 34, 35 in opposition to the signal from pick-off 24.

When used in connection with an automatic pilot, the device is mounted in the craft forward of and displaced from the horizontal axis of the craft about which it is effective to exert control. The arrangement of the device in the craft is such that it responds to accelerations in a vertical plane, to angular accelerations about a horizontal axis of the craft, and to tilt in the attitude of the craft from a reference position about the horizontal axis as defined by the device. This axis as shown may be the pitch axis 14 of the craft. The mass 16 of the device correctly senses upward vertical acceleration, positive angular acceleration and a nose up condition of the craft to cause pick-off 24 to produce a signal to operate motor 29 to move the elevators 15 downwardly. The opposite result is obtained when the mass 16 senses negative angular acceleration about axis 14, downward vertical acceleration and a nose down condition of the craft. While the device cannot distinguish between the accelerations that it responds to, the device provides proper sensing for each within a limited range to obtain necessary correction. The device provides proper sensing within a range of ±45 degrees from a level condition which define its effective limits of operation. A switch 36 may be provided to disable the automatic pilot if the craft is to be acrobatically maneuvered. Close regulation of the craft is obtained by an automatic pilot including the described sensing device without the need of rate signals in the system such as ordinarily required where a gyroscopic reference device is employed.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An accelerometer of the character described comprising a frame, a pair of flat, leaf springs each having one end thereof secured to opposite walls of said frame and the other end thereof extending in substantially parallel relation from said opposite walls, said springs being of such length that the end portions thereof lie in relatively spaced overlapping positions, a mass secured between and flat against the said end portions of both springs, the thickness of said springs being such that flexing thereof occurs upon movement of said mass in response to acceleration components acting on said mass in a direction normal to the broad flat surfaces of the springs and the width of said springs being such as to rigidly resist flexing thereof in response to acceleration components acting on said mass in a direction edgewise of said springs, and a two part pick-off having one part secured to said mass and the other part secured to said frame, whereby linear motion of said mass will occur displacing the one part of said pick-off linearly with respect to the other part thereof to thereby provide an output signal which varies linearly with the effective acceleration component acting on said mass.

2. An accelerometer of the character described comprising a frame, a pair of flat, leaf springs each having one end thereof secured to opposite walls of said frame and the other end thereof extending in substantially parallel relation from said opposite walls, said springs being of such length that the end portions thereof lie in relatively spaced overlapping positions, a mass secured between and flat against the said end portions of both springs, the thickness of said springs being such that flexing thereof occurs upon movement of said mass in response to acceleration components acting on said mass in a direction normal to the broad flat surfaces of the springs and the width of said springs being such as to rigidly resist flexing thereof in response to acceleration components acting on said mass in a direction edgewise of said springs, and an E-type pick-off having its core supported by said frame and its armature secured to said mass, whereby linear motion of said mass will occur displacing said armature linearly relative to said core thereby providing an output signal which varies linearly with the effective acceleration component acting on said mass.

PETER J. CHENERY.

References Cited in the file of this patent

UNITED STATES PATENTS

| Number | Name | Date |
|---|---|---|
| 1,154,396 | Hayot | Sept. 21, 1915 |
| 1,959,804 | Wittkuhns et al. | May 22, 1934 |
| 2,125,361 | Schwarzler | Aug. 2, 1938 |
| 2,139,558 | Moseley et al. | Dec. 6, 1938 |
| 2,302,670 | Buchanan | Nov. 24, 1942 |
| 2,317,028 | Chappell et al. | Apr. 20, 1943 |
| 2,386,777 | Bentley | Oct. 16, 1945 |
| 2,487,793 | Esval et al. | Dec. 18, 1946 |
| 2,498,997 | McLean | Oct. 27, 1948 |